Dec. 18, 1934.        C. W. ABBOTT        1,984,355
ELECTRIC WIRING SYSTEM
Filed Oct. 30, 1931      3 Sheets-Sheet 1

INVENTOR
Charles W. Abbott
BY
ATTORNEYS

Patented Dec. 18, 1934

1,984,355

UNITED STATES PATENT OFFICE 1,984,355

ELECTRIC WIRING SYSTEM

Charles W. Abbott, Larchmont, N. Y., assignor to The Bryant Electric Company, Bridgeport, Conn., a corporation of Connecticut Application October 30, 1931, Serial No. 571,962

28 Claims. (Cl. 247—3)

The invention relates to electric wiring systems, and, with regard to its more specific features, to conduits and wiring connections.

One object of the invention is to provide an electric wiring system that may be easily installed. Another object of the invention is to provide an electric wiring system that may be readily modified in order to provide additional outlets or change the location of outlets. Another object of the invention is to provide means for readily and economically carrying electric current to preferred outlet locations normally difficult or impossible to reach through the use of existing wiring systems. Another object of the invention is to provide an electric wiring system adapted to be installed with a minimum amount of cutting, replacing and the like of the structure to which the wiring is applied. Another object of the invention is to provide an electric wiring system of great flexibility. Another object of the invention is to provide an electric wiring system having a high factor of safety. Another object of the invention is to provide an electric wiring system that is attractive in appearance. Another object of the invention is to provide electric circuit wiring materials of low first cost and having installation and assembly features designed to materially reduce the labor of installation or subsequent extension. Another object of the invention is to provide electric wiring material that may be salvaged upon razing of the building in which it is located or upon rewiring for any cause. Another object of the invention is to provide an electric wiring system of practically universal application. Another object of the invention is to provide an electric conduit structure that may be embodied in a conduit of very small dimensions. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which are shown several of various possible embodiments of the mechanical features of this invention.

Similar reference characters refer to similar parts throughout the several views of the drawings.

As conducive to a clear understanding of the invention, it is noted that a surface wiring system has inherent advantages over a concealed wiring system insomuch as alteration or replacement of the former does not involve cutting into the walls of a building in which the wiring is applied. Furthermore, the original installation of a surface wiring system is simpler than the original installation of a concealed wiring system. Another respect in which a surface wiring system possesses an advantage over a concealed wiring system resides in the fact that in a concealed wiring system it is difficult to provide new outlets, the operation almost always involving the cutting into a wall and being sometimes attended by great expense.

Despite these inherent advantages of surface wiring systems, they have been used only to a limited extent so far as the original installation of wiring is concerned, and to a scarcely greater extent in the replacement or extension of wiring. This is because surface wiring systems as heretofore developed have involved rigid mouldings or other rigid bodies which not only are limited to application to plane surface walls but often cannot be applied with success in cases where the surfaces are even slightly irregular.

Another defect of surface wiring systems as heretofore developed resides in the fact that the making of additional outlets therein is almost as difficult as in the case of concealed wiring systems. Mouldings have been made of metal or wood which involves some difficulty in cutting, and when a cut has been made it is usually a considerable undertaking to conceal the cutting and give the outlet an attractive appearance. Another defect of previously existing mouldings lies in the fact that, being rigid and inflexible, they cannot readily be changed in position, and when they have been changed, repainting or re-decorating has invariably been necessary. Furthermore, most of the previously existing surface wiring systems, including mouldings as well as various other forms, have been unsightly and unattractive in appearance, and it has not been possible to readily harmonize them with the other fittings or fixtures, or with the furnishings of a room. The above and many other defects in heretofore existing wiring systems, including concealed wiring systems and surface wiring systems, has rendered the extension of an already existing system difficult or costly, or both, and made the installation of original wiring a costly matter, and, furthermore, has hampered the electrical industry by rendering the re-location of wiring or outlets from existing wiring an undertaking of such magnitude that many owners, tenants, house-holders and others have refrained from using all the electrical appliances which they otherwise would use.

The wiring system of the present invention differs from previous systems in being adaptable to embodiment in a form of extremely small cross section, thus rendering the material thereof relatively inconspicuous; in being inherently attractive in appearance; in being flexible in all respects so that not only may it be applied to any type of surface, curved or otherwise, but it may be made to take any desired course and may be shaped into any desired form, such as a panel and the like; and furthermore the cutting, joining or replacement thereof is an extremely simple operation, and the installation of additional outlets or the removal of previously existing outlets, without harming the appearance of the material, is extremely simple. Furthermore, the wiring system may be easily and quickly installed even by unskilled labor, and the material thereof is not expensive. These and many other advantages will hereinafter more fully appear as the description of an illustrative embodiment of the invention proceeds.

Figures 2, 3:
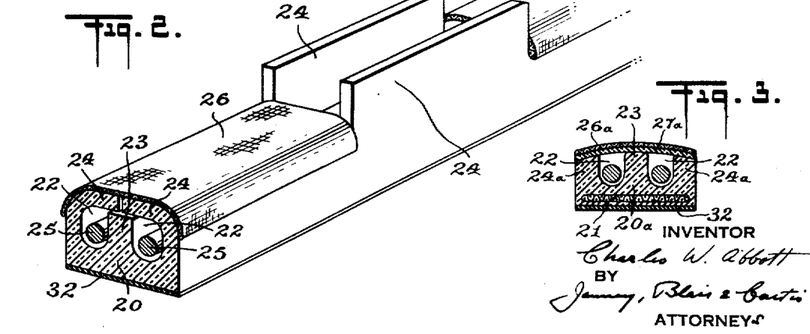
Figure 2 is a perspective view of one form of conduit constructed in accordance with the invention.
Figures 3, 4, 5 and 6 are cross sectional views illustrating modified forms of conduits.

Referring now to Figure 2, there is illustrated in perspective elevation and cross section a conduit which, because of its particular practicability for that purpose, I may term an extension feeder. This conduit comprises a base portion 20 which is preferably made of a rubber compound containing clay or other filler. The material of the conduit is preferably resilient enough to conform to various irregular surfaces to which it may be applied, but not so resilient that it will be distorted by sharp bends or tension of any kind. Thus the extension feeder may be located in various places without affecting the insulating qualities of the extension feeder by reason of distortion thereof. Preferably the material of the extension feeder has high insulating value.

On the upper surface of the base 20 are formed a pair of raceway grooves 22, 22 separated by a ridge portion 23. At the sides of the base portion 20 are a pair of flaps 24, 24 integral with the base portion and these flaps are originally disposed in an upright position as shown in the central portion of Figure 2. The flaps 24, 24 when the conduit is first formed, extend substantially above the level of the ridge portion 23.

Preferably the conduit is formed by one continuous extruding of a rubber compound and is relatively firm even prior to vulcanization. With the flaps 24, 24 in upright parallel relation as shown by the central portion of Figure 2, bare wires 25, 25 of good conducting material, for example copper, are inserted in the raceways 22, 22, in which they fit with a loose fit. The flaps 24, 24 are then folded inwardly to the position shown in the left-hand portion of Figure 2 so that their edges nearly abut, a slight gap being left between the edges of the flaps as clearly shown in Figure 2 in order that they shall not be integrally joined in the ensuing vulcanizing operation. Preferably also, the flaps 24, 24 are held in spaced relation to the central ridge 23 in order that the flaps shall not be integrally joined to the ridge 23 by the vulcanization of the conduit. This may be done, for example, by the interposition of a strip of paper between the flaps 24, 24 and the ridge 23.

With the flaps 24, 24 folded inwardly and downwardly as described and held in this position by a suitable forming device, a fabric tape 26, which preferably has on its under surface a thin coating of rubber 27 which may be deposited thereon by a calendering operation, is sealed over the flaps 24, 24. As shown in Figure 2, the fabric 26 extends from the vertical edge wall of the base portion 20 on one side to the vertical edge wall on the opposite side, covering the junction between the flaps 24, 24 and holding them in the arcuate folded-over position illustrated. The conduit is then vulcanized, and by the vulcanization process the conduit material is preferably given the properties of resiliency and rigidity heretofore described, and the coating of rubber 27 on the fabric cover 26 is integrally united with the flaps 24, 24 thus holding them securely in the position shown in the left-hand portion of Figure 2.

Referring now to Figure 3, there is illustrated in cross section a modified form of conduit having a base portion 20a which is generally similar to the base portion 20 of the conduit of Figure 2, having, however, no upwardly extending flaps 24, 24. Bounding the raceway grooves 22, 22 are edge portions 24a, 24a which extend to a level slightly below the central ridge 23 and are preferably slightly beveled as shown. Desirably embedded in the base portion 20a is a piece of fabric 21 which may be woven tape, the purpose of which is to strengthen the conduit.

After the wires 25, 25 have been inserted in the raceways 22, 22, the base member 20a of Figure 3 is covered with a rubber strip 27a the upper surface of which may have a fabric facing 26a. The rubber strip 27a is then vulcanized to the edge portions 24a, 24a, but preferably it is not vulcanized to the central ridge 23.

Figures 4, 9:
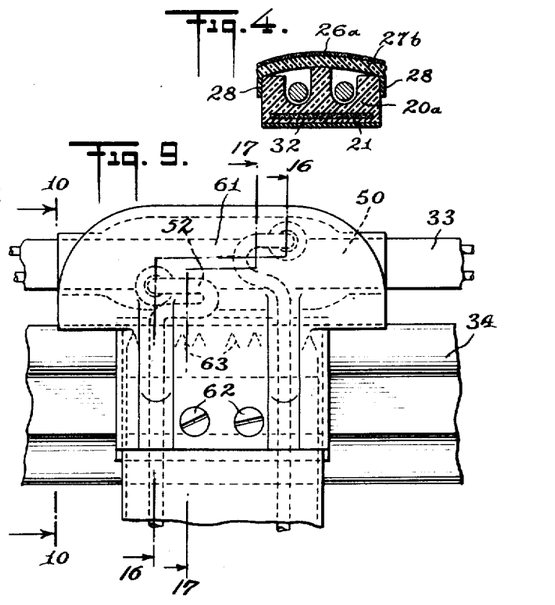
Figure 9 is a front elevation on an enlarged scale showing the connection between a conduit and a hanging conductor.

Referring now to Figure 4, a further modification of the conduit or extension feeder is shown in which a rubber strip or cover 27b is formed with edge fins 28, 28. The base member 20a of the modification of Figure 4 may be identical with the base member of the modification of Figure 3 and the cover or strip 27b may have a fabric facing 26a. In order to attach the cover or strip 27b to the base 20a, the fins 28 are bent downwardly over the sides of the base 20a, clamped in any suitable manner, and then vulcanized in place. It should be understood that in the several embodiments of the invention herein described, cementing or the like may be substituted for vulcanizing in order to attach the cover or strip.

Figure 5:
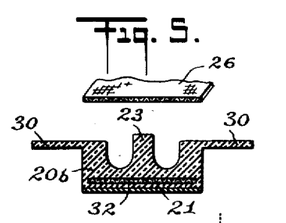

Referring now to Figure 5, a further modification is shown in which edge fins 30, 30 are formed on a base 20b, which is otherwise substantially like the base 20a. These fins 30, 30 constitute a cover and are folded over the top of the base 20b, approximately meeting in the center of the ridge 23 to which they may be secured by vulcanizing or cementing. It should be understood that in this modification the fabric facing 26 may be secured over the fins 30, 30 in the same manner in which it is secured to the flaps 24, 24 as already described, the modification of Figure 5 differing from the embodiment of Figure 2 chiefly in the original form of the portions to be folded over, in the thickness of these portions, and in the final form of the article, the conduit of Figure 5 being flatter on top as viewed in the drawings.

Figure 6:
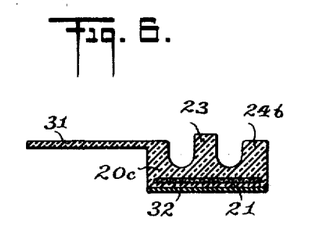

Figure 6 shows a further modification in which a single large fin 31 extending from one side of the base member 20c is folded over and secured to the opposite edge portion 24b by any one of the methods indicated.

Figure 1:
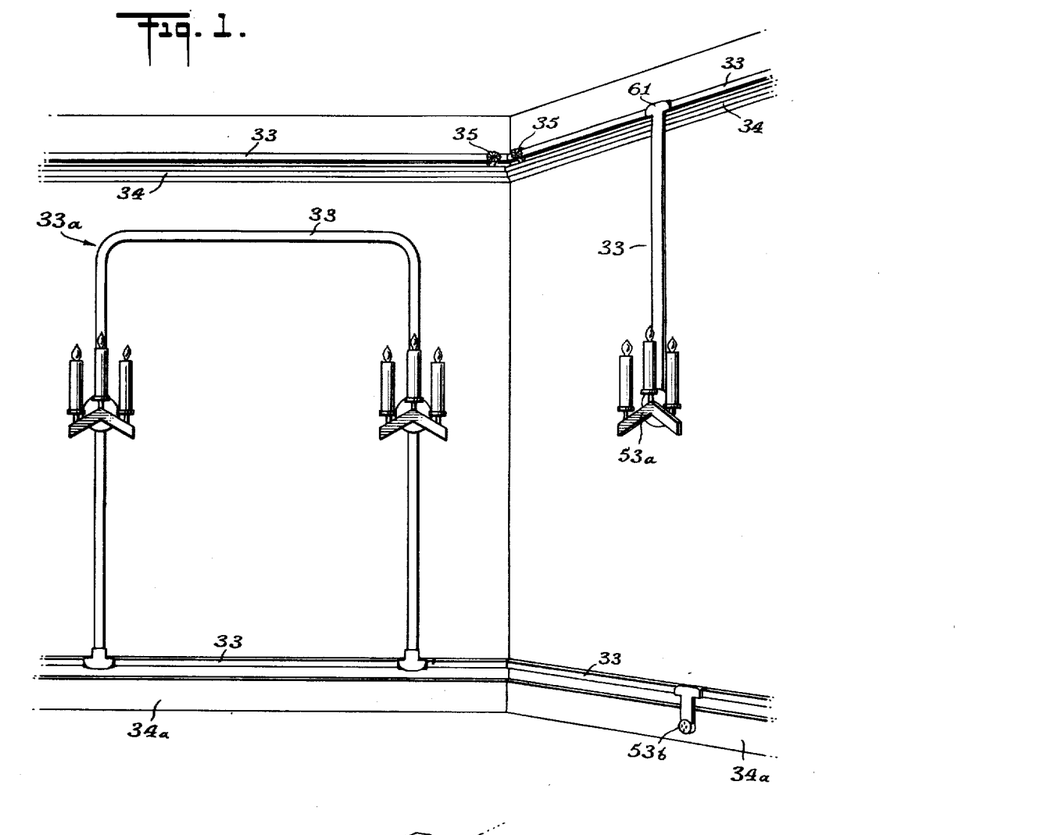
Figure 1 is a perspective view showing the interior of a room wired in accordance with the invention.

For the attachment of conduits or extension feeders to a wall, whether of wood, cement, tile, plaster, or other surface, a suitable adhesive such as glue 32 is deposited on the back of the base member 20, 20a, 20b or 20c, as the case may be. Although my invention is in nowise limited to any particular mode of use of the conduit or extension feeder, which in Figure 1 is generally indicated by the numeral 33, it may be conveniently located just above picture mouldings, door frames, window frames, baseboards, and the like, or it may be advantageously employed in what is known as "panel wiring", in which wall or ceiling spaces are symmetrically paneled with surface type conduits or mouldings. In Figure 1 I have shown the conduit or extension feeder 33 located above a picture moulding 34 and also above a baseboard 34a, and I have also shown the extension feeder mounted in the form of a panel 33a. Not only is the extension feeder 33 adapted for concealment behind wall structures and for symmetrical disposition with respect to wall structures so as to merge into them without destroying the artistic effect of a room, but the covering 26 or the fabric facing 26a may have impressed upon it any suitable design or color so as to harmonize with the fixtures, furniture, or fittings in a room. Furthermore, by reason of the simple construction of the conduit or extension feeder 33, including the fact that being made of a dielectric the wires 25 therein may be bare, the conduit or extension feeder may be very small in cross section, for example on the order of one-half of an inch in width and one-quarter of an inch in thickness, being thus a relatively inconspicuous object.

Figure 7:
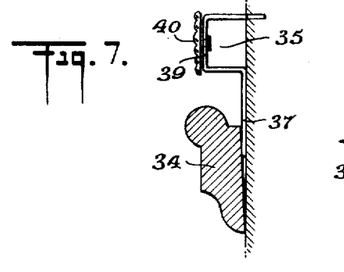
Figure 7 is a side elevation of a retaining strap.
Figure 8:
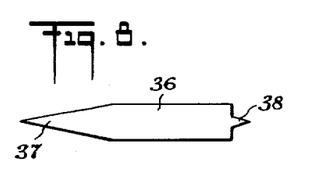
Figure 8 is a plan view of the material from which the strap of Figure 7 is formed.

Referring now to Figures 7 and 8, and also to Figure 1, metal retaining straps 35 are shown particularly adapted for holding the extension feeder 33 to door frames, window frames, picture mouldings, and the like. The retaining straps 35 may be made from sheet metal, and stampings from which the straps are made are indicated in Figure 8. Each strap 35 has a flat portion 36 having a pointed end 37 adapted to be pushed under a picture moulding, for example under the moulding 34. Each strap 35 also has a somewhat narrower pointed portion 38 which may be forced into plaster, wood, or the like. The remaining portion of the strap 35 is bent into U shape, as indicated at 39, and an ornamental button 40 may be secured to the strap. When securing the strap 35 in place a hammer may be used to drive in the sharp portion 38, and the button 40 acts as a head to receive the hammer blows.

Figure 10:
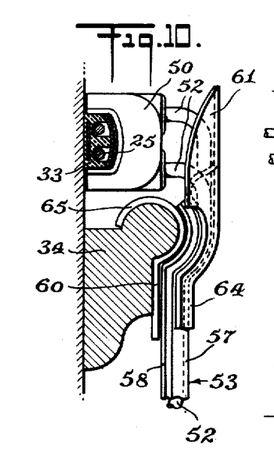
Figure 10 is a view partly in cross section and partly in elevation, the section being taken on the line 10—10 of Figure 9.
Figure 11:
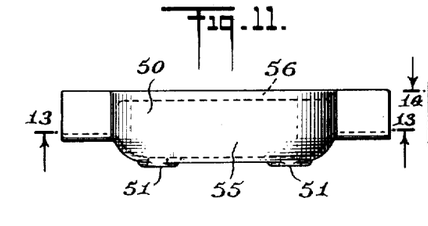
Figure 11 is a side elevation of a cover.
Figure 12:
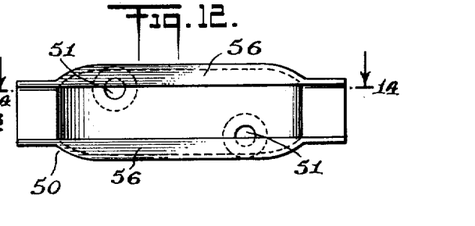
Figure 12 is a rear view of the cover.

Referring now to Figure 10 in connection with Figures 11 to 14 inclusive, the conduit or extension feeder 33 may be tapped at any place, and contact blocks including connections secured in place at the points selected. In order to lay bare the wires 25, 25, the covering of the conduit 33, either the fabric tape 26 or the rubber strip 27a with its fabric facing 26a or the cover 27b, is severed in lines perpendicular to the length of the extension feeder. This may be done with a knife, and in the case of that form of conduit or extension feeder shown in Figure 2, the cut should be made deep enough to cut through the flaps 24, 24 down to a level with the edge of the fabric tape 26. Likewise in the cases of the modifications of Figures 5 and 6, the fins 30, 30 or the fin 31 should be cut through. By reason of the fact that whichever type of cover, strip or the like is used, the vulcanized or cemented union between it and the base or the flaps 24, 24 readily yields to a tearing action after a transverse cut has been made in the cover or strip, and after, in some cases, a knife has been used to make a partial slit along the cemented or vulcanized union, the uncovering of the wires 25 at a selected point is an operation requiring only a short amount of time and needing only unskilled labor for the performance thereof. The wires 25 are reasonably loose in the raceways 22 so that they may be withdrawn from or pulled along said raceways to a limited extent to allow them to be raised above or beyond the ridge portion 23 for the attachment of the wires to binding posts hereinafter described. Preferably the wires 25 are bare so that no scraping and cutting action will be required in connection with the establishment of an outlet connection.

Figure 13:
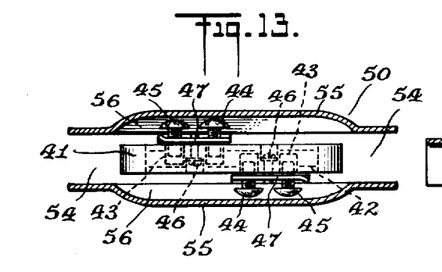
Figure 13 is a longitudinal sectional view of the cover and a contact block, the section being taken on the line 13—13 of Figure 11.
Figure 14:
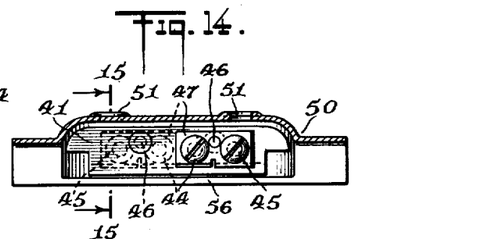
Figure 14 is a longitudinal sectional view of the cover and contact block, the section being taken on the line 14—14 of Figure 12.
Figures 15, 17:
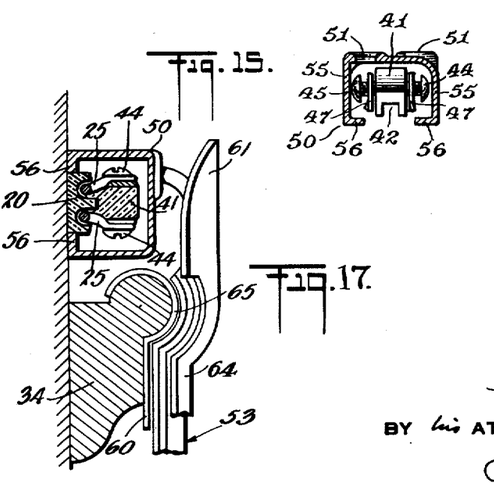
Figure 15 is a cross sectional view of the cover and contact block, the section being taken on the line 15—15 of Figure 14.
Figure 17 is a vertical sectional view as seen along the line 17—17 of Figure 9, showing, among other things, how the main conductors in the conduit are electrically and mechanically related to the contact block and related parts.

Referring now to Figures 13, 14 and 15, I provide elongated narrow contact blocks 41 which are preferably made of readily mouldable dielectric material such as one of the phenolic compositions. The contact blocks 41 have grooves 42 in one face thereof, as illustrated particularly by Figure 15. The grooves 42 are of a size to fit with a pressed fit over the central ridge 23 of the base 20 of the extension feeder or conduit 33. In a preferred embodiment of the invention this ridge 23 has nothing cemented to it and consequently it is at all times clean, and, after removal of the fabric facing or tape, or the rubber cover, as the case may be, the contact block may be readily secured in place on the ridge 23.

A pair of binding post screws 44 and 45 are located in staggered relation on each side of the block 41 as clearly indicated in Figure 13. Supported by screws 46 the heads of which are located in countersunk portions of the block 41, are contact plates 47 having tapped holes for the reception of the binding post screws 44 and 45. The binding post screws 44 and 45 are received in countersunk holes 43 provided in the sides of the contact block 41, as thus the clearance between the heads of the screws 44 and 45 and the contact plate 47 may be large or small, as desired under varying conditions. Preferably the supporting screws 46 are embedded in the countersunk recesses by filling the recesses with a suitable compound such as sealing wax, which insulates the screws and prevents them from unscrewing.

After the covering of the conduit 33 has been removed for a limited distance as described, and either before or after the contact block 41 has been placed in position on the ridge 23, the conductors 25 are pulled out of the raceways 22 and passed around the binding posts 44 which are then screwed down tightly. Figure 17 shows clearly the relation of the conduit to the contact block 41 and shows how the conductors 25 pass over the binding screws 44, thus, among other things, holding the contact block against displacement out of its interfitting relation to the central rib or ridge 23. In this manner the contact plates 47 as well as the binding posts 45 are electrically connected to the conductors 25. Furthermore, the tension on the conductors 25 tends to hold the contact block 41 in position. A slight amount of drawing of the conductors 25 in the raceways 22 suffices to allow them to be connected, as described, to the contact blocks, and it is noted that by reason of the freedom of the conductors in the raceways such withdrawal of the conductors takes place without distortion of or injury to the base 20 or its covering. Thus, not only is the conduit of the invention flexible, but the conducting wires therein are themselves flexible to an extent great enough to permit as much tapping of the extension feeders as desired without replacement thereof.

Referring now to Figures 11 to 15 inclusive, I provide a cover 50 made of good insulating and preferably mouldable material such as resilient rubber. The cover 50 has a pair of orifices 51, 51 on the front thereof and after the contact block 41 has been secured in place and electrically connected as described, wires 52, 52 from a hanging conductor 53 that is to be connected to the conduit 33 are passed through the holes 51. The ends of the wires 52, 52 (see Figure 10) are then secured to the screw binding posts 45, whereupon the cover 50 is secured in place on the extension feeder 33 covering the contact block 41. Still referring to Figures 11 to 15 inclusive, the cover 50 has narrow rectangular openings 54 at either end thereof and a somewhat bulging central portion 55 having bottom flanges 56, 56. In securing the cover 50 in place the flanges 56 are spread apart to allow them to pass over the screws 44 and 45, and the flanges 56, as well as the sides of the openings 54, are so spaced that they resiliently grip the sides of the conduit 33, as shown in Figure 10.

Figure 16:
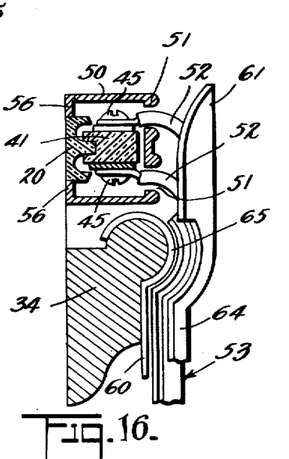
Figure 16 is a vertical sectional view along the line 16—16 of Figure 9 showing in detail how the branch line conductors are connected to the contact block and showing other relations of related parts.

The yieldability of the cover 50, as above described, coacts in a unique way with the rubber conduit 33 in that the yieldability of the latter permits the gripping flanges 56 of the cover to embed themselves slightly in the sides of the rubber conduit 33 and thus further resist displacement of the cover relative to the conduit and related parts, and the manner in which these flanges 56 may thus coact with the sides of the conduit 33 is well apparent from the sectional views of Figures 16 and 17.

In Figure 16 is also clearly shown how the extension feeder conductors or wires 52, 52 enter the orifices 51, 51 in the cover 50 and how they are connected to the binding posts or screws 45,  45. In this view, also, is shown how the cut or transversely slit portions of the channel-covering flaps or extensions 24, 24 of the conduit 33 (compare Figure 2) are accommodated at the respective sides of the contact block and also within the slightly bulging side walls of the cover 50, but it is to be understood that, if desired, the upstanding flaps or extensions of the rib portions of the conduit 33 may be, if desired, cut off. But with the construction above described, I make it possible to avoid even such a cutting off operation and thus I may achieve the exposure of the conductors 25, 25 in the conduit 33 by simply performing two simple transverse slitting or cutting operations, as with a knife, with results clearly indicated in Figure 2.

The hanging conductor 53 and immediately related or coacting features of construction are claimed in a separate application, Serial Number 580,111 filed December 10, 1931.

For the purposes of the invention claimed herein, it will suffice to note that the hanging conductor 53 (to which may be attached a lamp socket 53a, an outlet 53b, or other desired device) may comprise a facing 57 of ornamental fabric, and a backing 58 of stronger fabric; and conductors located in plaits therebetween.

Referring particularly to Figure 10, for the support of a hanging conductor 53, a hook-like member 60 is provided, this hook-like member 60 having fastened to it a shield-like sheet metal member 61 by means of screws 62, 62 illustrated in Figure 9. The screws 62, 62 also serve to secure the fabrics 57 and 58 of the hanging conductor 53 in position between the hook 60 and the shield member 61, as they not only extend through the fabric but also effect a tight clamping action of the members 60 and 61 to clamp the hanging conductor 53 therebetween. Preferably struck outwardly on the outer rounded face of the hook 60 are teeth 63 to assist in gripping the backing 58. In the shield member 61 are grooves 64 to receive the conductors 52, and the shield member 61 is formed to conform to the front surface of the hook 60, as shown. The hook portion 65 of the hook 60 may be placed over a picture moulding 34, thus securing the hanging conductor 53 in position with the upper portion of the shield 61 covering the cover 50 for the contact block 41. If desired the screws 62, 62 may be long enough to bear firmly against or even penetrate into the picture moulding 34, in order that lateral strains set up at this point by movement of the hanging conductor may not be imparted to the electrical connections of the contact block. An inspection of Figure 9 will show that in the manner described a hanging conductor 53 may be attached to the extension feeder or conduit 33 with substantially nothing of the connection visible except an ornamental shield 61.

The extension feeder 33 may be placed in position wherever desired by means of the glue 32, which remains firm and dry until rendered adhesive by a liquid, such as water which may be brushed on at the time of installation. The base 20 of the feeder 33, being made of rubber, which is preferably left in a substantially resilient condition, may be bent into any desired position, either in the plane of the back of the base 20 or in the plane of a side thereof. Since the conductors 25 are free in the raceways 22, a very sharp bend of the extension feeder 33 may be made, and the ridge portion 23 prevents short-circuiting of the conductors if they are bare, as in the preferred forms of the invention. One reason why the flaps 24, 24 or the fabric or rubber cover of the extension feeder 33 should be free from the ridge 23 is that the flexibility of the extension feeder is thereby increased. Furthermore, there is in that case no danger of tearing away the ridge 23 when a section of the strip or covering 26 is removed as described. The extension feeder 33 may be secured in a moment to an ordinary wall and will lie flat against it, which, owing to the unevenness of the surface of the average wall, cannot be readily done with metal mouldings.

In case it is desired to connect additional hanging conductors to the extension feeder 33, the connection may be quickly made by securing in place an additional contact block after having removed a section of the covering in the manner already described. It may be desired to change the location of a hanging conductor 53, in which case a new outlet will be provided in the extension feeder 33 at the new location. In order to protect the wires 25, 25 in the extension feeder 33, and in order to maintain the attractive appearance of the extension feeder, the flaps 24, 24 may be refolded into position and a strip of tape 26 secured in place.

It should be noted that throughout a minimum use has been made of screws, bolts, or the like, in assembling the parts of the wiring system, and, although so far as certain features of the invention are concerned such means of connecting the various elements of the wiring system may be employed, the connections indicated are preferred. The contact block 41 is secured in position by the groove 42 which fits over the ridge 23 and by reason of the fact that the conductors 25, which pass over the binding posts 44, tend to hold it in place. The cover 50 is resiliently secured in position by reason of the fact that it engages the top and bottom of the extension feeder 33, being sprung into position. The elimination of soldered joints, long taped connections, and the like, is an advantageous feature according to one aspect of my invention.

It will thus be seen that there has been provided by this invention an apparatus in which the various objects hereinabove set forth, together with many thoroughly practical advantages, are successfully achieved.

In referring to the member 33 as a conduit or extension feeder, it is not intended to limit the invention to what might, in commerce, be so termed, the terminology of commerce being affected by arbitrary classifications and the terms being mostly specific rather than general. Consequently, in the appended claims, no limitations should be implied apart from the combinations set forth. Furthermore, as many possible embodiments may be made of the above invention, and as many changes might be made in the embodiment above set forth, it is to be understood that all matter hereinbefore set forth, or shown in the accompanying drawings, is to be interpreted as illustrative and not in a limiting sense.

I claim:

1. In apparatus of the class described, a rubber conduit having a base portion and a plurality of raceways extending therealong and open lengthwise thereof, adjacent raceways being separated by a ridge upstanding from said base portion, a reinforcing fabric embedded in said base portion and reinforcing those parts of the latter that are weakened by the raceways in said conduit, an adhesive on the back of said base portion for securing said conduit to a wall or the like and thereby holding said base portion against distortion out of the plane of said wall, a rubber strip closing over said raceways, means securing said strip to the edge portions of the conduit, and a fabric secured to the top of said rubber strip.

2. In apparatus of the class described, a rubber conduit having a pair of raceways extending lengthwise thereof and open along their entire length, a cover closing said raceways, said cover being made of flexible material and extending along the length of said conduit, and means detachably securing said cover to said conduit, whereby said raceways may be exposed.

3. In apparatus of the class described, a conduit of resilient material having a pair of open raceways extending therealong, a strip or covering for said raceways overlying the latter to close them and secured to the edge of said conduit, said strip or covering being flexible, and a pair of conductors each of less cross-section than the cross-sectional area of said closed raceway and hence respectively loosely mounted in said raceways.

4. In apparatus of the class described, a flexible conduit of non-metallic material having a pair of lengthwise extending open raceways, conductors each of less cross-section than the cross-sectional area of a raceway and hence loosely mounted in said raceways, a strip covering said raceways and conduit, an ornamental fabric on said strip, and means detachably securing said strip in closing position.

5. In apparatus of the class described, the combination with an extension conductor-carrying conduit having a pair of raceways extending throughout its length and a pair of conductors loosely mounted therein, there being a ridge between the raceways, of a contact block having a groove on the bottom thereof fitting on said ridge, and a pair of binding posts on opposite sides of said block for attachment to said conductors.

6. A conduit comprising a base portion, having a pair of raceways extending lengthwise thereof and open along their entire length, said base portion being made of flexible material, flaps integral with said base portion, a central ridge extending lengthwise of and intermediate of said raceways, the flaps being folded over upon said ridge and closing the raceway, and fabric secured to said flaps on the outside thereof holding the flaps together and in raceway-closing position.

7. In apparatus of the class described, in combination, a rubber conduit having a base portion and a plurality of longitudinally extending but laterally spaced upstanding rib-like portions forming channels therebetween, certain of said rib-like portions having flap-like extensions extending toward an adjacent rib-like portion to substantially close over the channel therebetween, and relatively easily removable means for releasably holding said flap-like portions in channel-closing position.

8. In apparatus of the class described, in combination, a relatively flexible rubber conduit having a base portion and a plurality of longitudinally extending but laterally spaced upstanding rib-like portions forming channels therebetween, certain of said rib-like portions having flap-like extensions adapted to be bent over toward an adjacent rib-like portion to substantially close over the channel therebetween, said bent flap-like portion resting against said adjacent rib-like portion, and a fabric tape extending lengthwise of said conduit and over said bent flap-like portion and secured to said conduit by an adhesive for holding said flap-like portion in channel-closing position.

9. In apparatus of the class described, in combination, a relatively flexible rubber conduit having a flat base portion and a plurality of longitudinally extending but laterally spaced upstanding rib-like portions forming channels therebetween, certain of said rib-like portions having flap-like extensions adapted to be bent over toward an adjacent rib-like portion to substantially close over the channel therebetween, bare conductors lying in said channels, and means releasably holding said flap-like portions in channel-closing position, whereby access to said conductors may be readily gained.

10. In apparatus of the class described, in combination, a conduit made up of a semi-rigid and relatively flexible dielectric material and having a flat base portion adapted to rest against a wall or the like and having at least two longitudinally extending but laterally spaced upstanding rib-like portions to form a conductor-receiving channel therebetween, one of said rib-like portions being of greater dimension than the other thereby to provide a part thereof for closing said channel, said part extending over said channel and into engagement with the other rib-like portion whereby a conductor laid in said channel is on all sides enclosed and insulated.

11. In apparatus of the class described, in combination, a conduit made up of a semi-rigid and relatively flexible dielectric material and having a base portion adapted to rest against a wall or the like, and having at least two longitudinally extending but laterally spaced upstanding rib-like portions to form a conductor-receiving channel therebetween, one of said rib-like portions being of greater dimension than the other thereby to provide a part thereof that extends over and closes said channel and extends into engagement with the other rib-like portion, whereby a conductor in said channel is enclosed, and means for holding said part in channel-closing position and maintaining the conductor against exposure.

12. In apparatus of the class described, in combination, a conduit made up of a semi-rigid and relatively flexible dielectric material and having a flat base portion adapted to rest against a wall or the like and having at least two longitudinally extending but laterally spaced upstanding rib-like portions to form a conductor-receiving channel therebetween, one of said rib-like portions being of greater dimension than the other thereby to provide a channel-closing part thereof that extends over said channel and into engagement with the other rib-like portion for thereby closing said channel and completing the enclosing of a conductor within said conduit, the material of which said conduit is made being capable of being cut as with a knife, and means for releasably holding said part in channel-closing position, and a conductor in said closed channel whereby, upon said holding means being made to release said part, said part may be cut transversely of said conduit to form a flap that may be lifted away from said other rib-like portion to open said channel and to expose from said channel a portion of the length of said conductor.

13. In apparatus of the class described, in combination, a conduit made of a semi-rigid dielectric material having a base portion adapted to rest against a wall or the like and provided with a plurality of longitudinally extending and laterally spaced upstanding rib-like portions to form therebetween a plurality of conductor-receiving channels, whose sides are formed by said spaced rib-like portions and whose bottom is formed by said base portion, the channels being thereby open along their length, and means of substantially similar dielectric material forming a closure juxtaposed to the bottom of the channels for closing said channels and thereby encase conductors therein, and means holding said closure means in channel-closing position.

14. In apparatus of the class described, in combination, a conduit made of a semi-rigid dielectric material having a base portion adapted to rest against a wall or the like and provided with a plurality of longitudinally extending and laterally spaced upstanding rib-like portions to form therebetween a plurality of conductor-receiving channels, means of substantially similar dielectric material for closing said channels and thereby encase conductors therein, a fabric tape extending lengthwise of said conduit and overlapping both said base portion and said first-mentioned means, and an adhesive for securing said fabric tape thereto whereby said tape holds said first-mentioned means in channel-closing position.

15. In apparatus of the class described, in combination, a conduit made of a semi-rigid dielectric material, and having a base portion adapted to rest against a wall or the like and outer portions spaced from said base portion by a plurality of longitudinally extending but laterally spaced parts whereby there is formed a plurality of longitudinally extending but laterally spaced and completely enclosed channels, and conductors lying loosely in said closed channels, the cross-sectional area of the channels being greater than the cross-section of the respective conductors therein, whereby, upon bending said conduit with the conductors contained therein, relative longitudinal movement between said conductors and said conduit can take place.

16. In apparatus of the class described, in combination, a conduit made of a semi-rigid dielectric material, and having a base portion adapted to rest against a wall or the like and outer portions spaced from said base portion by a plurality of longitudinally extending but laterally spaced parts whereby there is formed a plurality of longitudinally extending but laterally spaced and completely enclosed channels, and conductors lying loosely in said closed channels, the cross-sectional areas of the channels being greater than the cross-section of the respective conductors therein whereby the conductor in any one of said closed channels may be moved along its channel, said upper portion being capable of being cut, as with a knife, whereby said upper portion may be severed and said channels completely uncovered throughout a suitable portion of their length and said conductors drawn along said channels.

17. In apparatus of the class described, in combination, a supporting surface like that of a wall or the like, a conduit made of a semi-rigid and flexible dielectric material and having therein a raceway for receiving a conductor, the material of said conduit having sufficient rigidity to make the walls of said raceway self-sustaining and holding the walls against collapse of said raceway, a conductor in said raceway, said raceway having a cross-sectional area greater than that of the conductor therein and the conductor therefore being movable relative to the walls of said raceway, said conduit having a flat base portion adapted to rest against said supporting surface, the flexibility of said conduit causing the latter to adapt the flat base portion thereof to departures in said supporting surface from a true plane, and an adhesive securing said conduit to said surface, the movability of said conductor relative to the walls of said raceway preventing any rigidity of the conductor from preventing said conduit to adapt itself to said departures in said supporting surface and thus preventing any rigidity of the conductor from interfering with the securing action of said adhesive throughout the area of said base portion and throughout said departures in said supporting surface from a true plane.

18. A supporting surface like that of a wall, or the like, a conduit made of a semi-rigid and flexible dielectric material having extending therethrough a closed raceway for receiving and enclosing a conductor and having a flat face adapted to rest against said supporting surface, and an adhesive for securing said conduit to said supporting surface, the outer wall portions of said closed raceway being parted in a direction lengthwise of said conduit and being thereby capable of separation to open said raceway to expose the conductor therein, and means for releasably holding said parted wall portions in channel-closing position, whereby upon said wall portions being released, said parted wall portions may be separated and access to a conductor in said raceway may be gained without disturbing the connection of said conduit to said supporting surface.

19. In apparatus of the class described, the combination with a conduit made of a semi-rigid and relatively flexible dielectric material having a base portion along which extend a plurality of laterally spaced but upstanding rib-like portions to form channels therebetween, certain of said rib-like portions having flap-like extensions adapted to extend over toward an adjacent rib-like portion to substantially close over the channel therebetween, said channels being opened throughout a short interval of length of said conduit by having said flap-like portions upstanding and hence out of channel-closing position, and conductors in said channels, of means for tapping into said conduit and making an electrical connection to the conductors in the channels thereof, said means including a block of insulating material carrying connecting terminals and adapted to be received between said upstanding flap-like extensions that are bent out of channel-closing position and having a base portion shaped to interfit with a portion of said conduit in said interval, said connecting terminals having conductor-engaging parts respectively engaging under said conductors, whereby said conductors hold said block in place, and a cover member extending over said block and said upstanding flap-like extensions and the portion of said conduit to which said block is related, said cover having aperture means for passing therethrough conductors leading to said connecting terminals.

20. In apparatus of the class described, the combination with a conduit made of a semi-rigid and relatively flexible dielectric material having a base portion along which extend a plurality of laterally spaced but upstanding rib-like portions to form channels therebetween, certain of said rib-like portions having flap-like extensions adapted to extend over toward an adjacent rib-like portion to substantially close over the channel therebetween, and conductors in said channels, of means for tapping into said conduit and making an electrical connection to the conductors in the channels thereof, said means including a block of insulating material carrying connecting terminals and adapted to be received between parts of said flap-like extensions bent out of channel-closing position and having a base portion shaped to interfit with one of said rib-like portions, said connecting terminals having conductor-engaging parts respectively engaging under said conductors, whereby said conductors hold said block in place, and a cover member extending lengthwise of said conduit having end portions substantially U-shaped in cross-section for substantially closely enveloping the tops and sides of said conduit and having an intermediate enlarged portion for closing over said terminal block and said parts of said flap-like extensions and having aperture means for passing therethrough conductors leading to said connecting terminals.

21. In apparatus of the class described, the combination with a conduit made of a semi-rigid and relatively flexible dielectric material having a base portion along which extend a plurality of laterally spaced but upstanding rib-like portions to form channels therebetween, certain of said rib-like portions having flap-like extensions adapted to extend over toward an adjacent rib-like portion to substantially close over the channel therebetween, and conductors in said channels, of means for tapping into said conduit and making an electrical connection to the conductors in the channels thereof, said means including a block of insulating material carrying connecting terminals and adapted to be received between parts of said flap-like extensions bent out of channel-closing position and having a base portion shaped to interfit with one of said rib-like portions, said connecting terminals having conductor-engaging parts respectively engaging under said conductors, whereby said conductors hold said block in place.

22. In apparatus of the class described, the combination with a conduit made of a semi-rigid and relatively flexible dielectric material having a base portion along which extend a plurality of laterally spaced but upstanding rib-like portions to form channels therebetween, at least one of said rib-like portions having a flap-like extension adapted to extend over toward an adjacent rib-like portion to substantially close over the channel therebetween, and conductors in said channels, of means for tapping into said conduit and making an electrical connection to the conductors in the channels thereof, said means including a block of insulating material carrying connecting terminals and adapted to be received alongside of a flap-like extension bent out of channel-closing position and having a base portion resting against that portion of said conduit throughout which said flap-like extension is bent out of channel-closing position, said connecting terminals having conductor-engaging parts respectively engaging under said conductors, whereby said conductors hold said block in place, a cover member extending over said block and the portion of said conduit to which said block is related, said cover having aperture means for passing therethrough conductors leading to said connecting terminals, and means for holding said cover member in assembled relation relative to said block and conduit.

23. In apparatus of the class described, the combination with a conduit made up of a semi-rigid and relatively flexible dielectric material having a base portion provided with a plurality of longitudinally extending but laterally spaced upstanding rib-like portions forming channels therebetween and having means of substantially similar material closing said channels throughout their length excepting for a relatively small interval and conductors in said closed channels but exposed at said above-mentioned interval, of means for electrically tapping the circuit formed by said conductors comprising a block of insulating materials seated upon said conduit at said interval and having a width substantially the same as the width of said conduit, said block carrying contact means for respectively engaging the conductors in said channels and also branch line conductors, and cover means extending over said block and encasing the latter and also the side portions of said channel throughout said interval.

24. In apparatus of the class described, the combination with a conduit made up of a semi-rigid and relatively flexible dielectric material having a base portion provided with a plurality of longitudinally extending but laterally spaced upstanding rib-like portions forming channels therebetween and having means of substantially similar material closing said channels throughout their length excepting for a relatively small interval and conductors in said closed channels but exposed at said above-mentioned interval, of means for electrically tapping the circuit formed by said conductors comprising solid dielectric means recessed along its bottom to receive therein a rib-like portion exposed in said interval and having a plurality of conductive members respectively exposed to the open channels in said interval and engaging the conductors therein and carrying means for electrically connecting extraneous conductors to said conductive members, and cover means extending over said interval of length of said conduit and encasing said solid dielectric means and said interval, said cover means having aperture means for leading therethrough said extraneous conductors.

25. In apparatus of the class described, in combination, a conduit made up of a semi-rigid and relatively flexible dielectric material and having a base portion adapted to rest against a wall or the like, and having three longitudinally extending but laterally spaced upstanding rib-like portions to form two conductor-receiving channels therebetween, said channels being open throughout their length along said conduit, the outermost of said rib-like portions being of greater dimension than the central rib-like portion and each of said outer rib-like portions having thereby a channel-closing part that bridges over and closes the adjacent channel and extends into engagement with the central rib-like portion.

26. In apparatus of the class described, in combination, a conduit made up of a semi-rigid and relatively flexible dielectric material and having a base portion adapted to rest against a wall or the like, said base portion having at least three longitudinally extending but laterally spaced upstanding rib-like portions to form therebetween at least two conductor-receiving channels, said channels being open throughout their length along said conduit, one of the endmost rib-like portions having an extension of sufficient dimension to be laid over upon the remaining rib-like portions and thereby to close said conductor-receiving channels.

27. In apparatus of the class described, the combination with a conduit of insulating material having extending lengthwise thereof a plurality of completely enclosed channels and conductors in said channels, a closing wall of each of said channels being opened throughout a short interval of length of said conduit, thereby to expose the conductors therein, of means for tapping the circuit formed by said conductors comprising a block of insulating material positioned along said conduit at said interval and having means for electrically engaging said exposed conductors and for electrically engaging extraneous conductors, said block resting on top of said conduit and being interfitted with a portion of said conduit and being held to said conduit by said first-mentioned conductors, and a casing-like cover having a cross-section like that of an inverted U extending over and enclosing the top and two sides of said block and enclosing also the sides of said conduit, said cover having a length in the direction of the length of said conduit greater than the length of said block and having its end walls cut out to receive therethrough said conduit just beyond the respective ends of said interval, said cover having means for bringing out from therein, said extraneous conductors.

28. In apparatus of the class described, in combination, a conduit having a passage therein for the reception of a conductor, a portion of the wall of said conduit being cut away to expose said conductor, means for securing said conduit to a wall or the like, a contact block related to said conduit in the region of the latter where said conductor is exposed and having said conductor in engagement with a contact on said block, said conductor holding said block to said conduit, an extension conductor connected to said contact on said block for thereby extending the circuit of said first-mentioned conductor, and a cover over said block, said cover having means for yieldably gripping said conduit to hold it assembled to the latter and also with respect to said wall, and having means for bringing said extension conductor out from in under said cover.

CHARLES W. ABBOTT.

CERTIFICATE OF CORRECTION.

Patent No. 1,984,355. December 18, 1934.

CHARLES W. ABBOTT.

It is hereby certified that error appears in the printed specification of the above numbered patent requiring correction as follows: Page 7, second column, line 19-20, claim 20, for "aperature" read aperture; page 8, first column, line 11, claim 23, for "materials" read material; and second column, line 40, claim 27, strike out the comma, and insert the word under; and that the said Letters Patent should be read with these corrections therein that the same may conform to the record of the case in the Patent Office.

Signed and sealed this 5th day of March, A. D. 1935.

(Seal)

Leslie Frazer
Acting Commissioner of Patents.